Oct. 11, 1949.                B. E. BERLINGER                2,484,546
                                FISHING REEL
Filed July 30, 1947                                    2 Sheets-Sheet 1
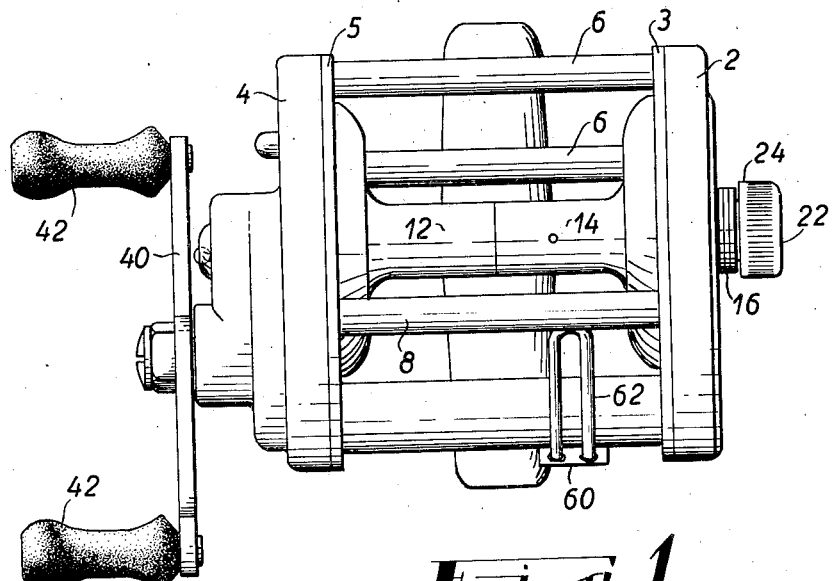
Fig. 1.
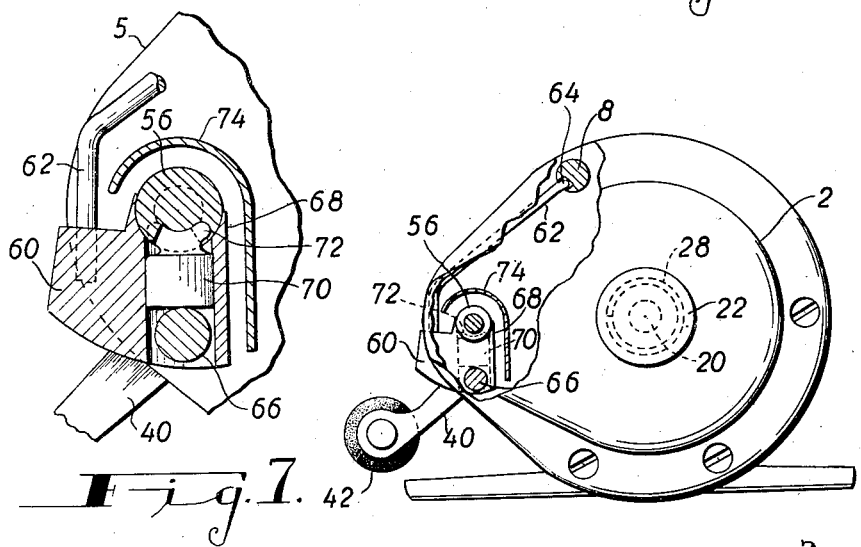
Fig. 7.
Fig. 2.
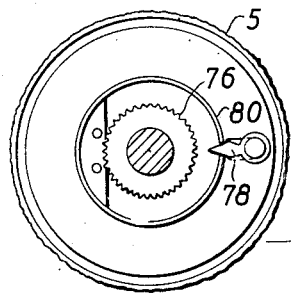
Fig. 3.
INVENTOR.
BERNARD E. BERLINGER
BY
Busser & Harding
ATTORNEYS Oct. 11, 1949.　　　　B. E. BERLINGER　　　　2,484,546
FISHING REEL
Filed July 30, 1947　　　　　　　　　　　　2 Sheets-Sheet 2
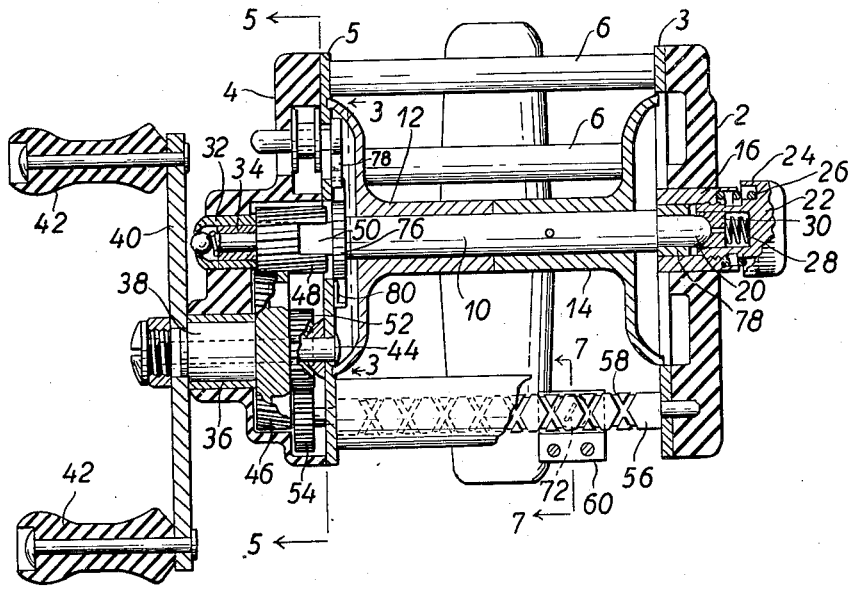
_Fig.4._
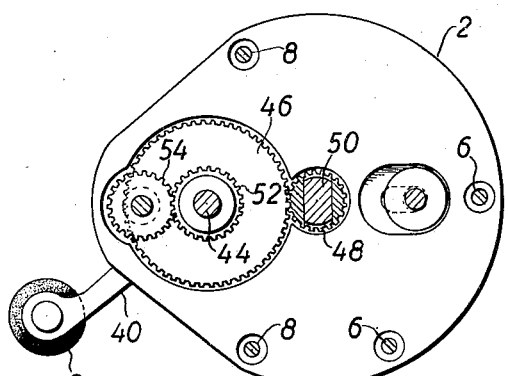
_Fig.5._
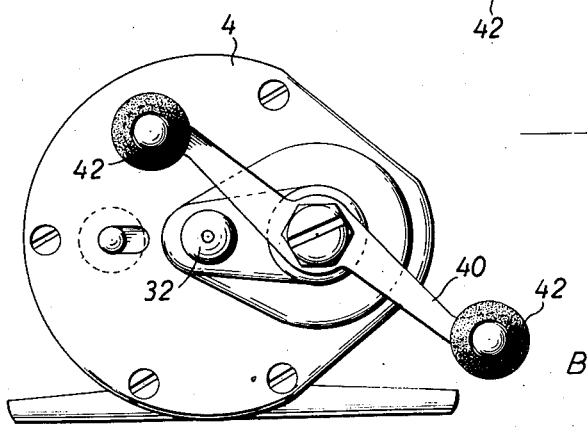
_Fig.6._
INVENTOR.
BERNARD E. BERLINGER
BY
*Busser & Harding*
ATTORNEYS Patented Oct. 11, 1949

2,484,546

UNITED STATES PATENT OFFICE 2,484,546

FISHING REEL

Bernard E. Berlinger, Elkins Park, Pa., assignor to Quaker City Gear Works, Inc., Philadelphia, Pa., a corporation of Pennsylvania Application July 30, 1947, Serial No. 764,787

1 Claim. (Cl. 242—84.4)

This invention relates to fishing reels and has reference particularly to an improved level wind therefor.

Heretofore it has been customary to mount the carrier of a level wind mechanism directly on the cross-threaded screw which passes through a cylindrical opening in the carrier and engages the pivoting follower. The sharp edges of the screw threads tend to burr or ream the bore in the carrier producing roughness which gradually increases the effective friction to a point where proper operation ceases. The general object of the present invention is to provide a carrier construction and mounting whereby such troubles are avoided. Specifically, this end is accomplished by mounting the carrier on a smooth rod for back and forth movement with only partial embracing by the carrier of the lead screw so that the function of the latter so far as engagement with the carrier is concerned is merely that of preventing angular movement about the guide rod. In fact, even this function is minor since in the preferred form of the invention the line guide loop is guided in a groove in one of the spacers between the ends of the reel.

A further object of the invention is to improve the mounting of the screw follower with simplification of the construction. These and other objects of the invention particularly relating to details will become apparent from the following description read in conjunction with the accompanying drawings in which:

Figure 1 is a plan view of a reel embodying the improvements;

Figure 2 is an end elevation of the reel partially broken away to show certain details in section;

Figure 3 is a section taken on the plane indicated at 3—3 in Figure 4;

Figure 4 is an axial section showing details of the reel;

Figure 5 is a transverse section taken on the plane indicated at 5—5 in Figure 4;

Figure 6 is an end elevation looking from the left at Figure 1; and

Figure 7 is a fragmentary transverse section taken on the plane indicated at 7—7 in Figure 4.

The reel comprises plastic moulded ends 2 and 4 associated with metallic end members 3 and 5, these being secured together in conventional fashion through the use of screws and spacers indicated at 6 and 8. A shaft 10 carries members 12 and 14 providing a spool. A bushing 16 in the end member 2 carries a bearing bushing 18 for the right-hand end of the shaft as viewed in Figure 4, which end terminates in spherical surface 20. A screw 22 threaded in the bushing 16 is provided with a skirt 24. Between an annular groove within the skirt and an annular groove in the bushing 16 there is located a locking spring 26 arranged to retain the screw 22 in adjusted position. Within a bore in the screw 22 there is a spring 28 acting upon a member 30 adapted to slide lengthwise in the bore and provided with a spherical socket adapted to receive the spherical end of the shaft 10.

In the left-hand member 4 there is located a bushing 32 which carries a bearing bushing 34 for the left-hand end of the shaft. The arrangement just described is similar to that illustrated in my prior application, Serial No. 563,832, filed November 17, 1942, now patent No. 2,454,590 dated November 23, 1948, and provides an automatic snubbing action for the spool.

A bushing 36 in the end member 4 mounts a hub 38 to which is secured a member 40 providing arms carrying handles 42. The hub 38 is rotatable on a pin 44 and carries gears 46 and 52 which mesh respectively with pinions 48 and 54. The pinion 48 is transversely slotted to engage the squared portion 50 of the shaft 10 so that this shaft and the spool which it carries are rotatable through rotation of the member 40.

The pinion 54 is secured to the lead screw 56 which is cross-threaded in conventional fashion as indicated at 58 for imparting back and forth movements to the level wind carrier. The carrier 60 has secured thereto a wire loop 62 constituting the line guide, the outer end of which runs in a longitudinal groove 64 in the spacer 8. A fixed rod 66 passes through a bore in the carrier 60 to guide it for back and forth movement. As will be evident, the engagement of the line guide in the groove 64 maintains constant the angular relationship of the carrier to the rod 66.

The present carrier is provided with a socket 68 partially embracing the screw and having no forcible engagement with the screw. At most, if engagement does occur due to play between the parts, there will merely result prevention of angular motion of the carrier about the rod 66.

A cylindrical bore extending at right angles to the rod 66 contains the follower 70 provided with a thread engaging portion 72. This follower 70 is held in position by the rod 66 and the lead screw and consequently there is no necessity for providing a screw cap or the like for holding it in place. It is free to oscillate back and forth in its bore upon reversals of movement.

The usual click arrangement is provided comprising a serrated disc 76 carried by the shaft 10 engageable with the click 78 which is controlled by the spring 80. It will be evident from the foregoing that an improved level wind is provided in which there is avoided wear by the threads on the carrier so that the life of the reel is greatly increased. Free movement of the parts results consistent with simple construction in particular in the mounting of the screw follower.

It will be evident that variations in details may be made without departing from the invention as defined in the following claim.

What I claim and desire to protect by Letters Patent is:

A fishing reel comprising a frame, a spool mounted therein, and a level wind mechanism comprising a reversely threaded screw rotatable with said spool, a carrier having a cylindrical bore therein, a rod extending parallel to said screw and through said bore, a line guiding loop mounted on said carrier, a second rod extending parallel to said screw and provided with a longitudinal slot within which said loop slides, said carrier having a second bore perpendicular to and intersecting the first mentioned bore, and a screw thread follower located in said second bore and held in the second bore by the first mentioned rod, said carrier being provided with an open groove receiving said screw, angular movement of the carrier about the first mentioned rod being limited by engagement of said loop in the slot in the second rod to prevent wear of the carrier by the screw.

BERNARD E. BERLINGER.

REFERENCES CITED

The following references are of record in the file of this patent:

UNITED STATES PATENTS

| Number | Name | Date |
|---|---|---|
| 1,455,358 | Russell | May 15, 1923 |
| 1,463,642 | Welch | July 31, 1923 |
| 1,715,803 | Welch | June 4, 1929 |
| 2,134,099 | Balz | Oct. 25, 1938 |